United States Patent

Seppälä et al.

[11] Patent Number: 5,925,726
[45] Date of Patent: Jul. 20, 1999

[54] THERMOPLASTIC BIODEGRADABLE POLYESTER A PROCESS FOR THE PREPARATION THEREOF AND ARTICLES MANUFACTURED THEREFROM

[75] Inventors: Jukka Seppälä, Helsinki; Mika Härkönen, Vantaa; Kari Hiltunen; Johan-Fredrik Selin, both of Helsinki; Jyrki Hakola, Järvenpää, all of Finland

[73] Assignee: Neste OY, Espoo, Finland

[21] Appl. No.: 08/930,641

[22] PCT Filed: Apr. 3, 1996

[86] PCT No.: PCT/FI96/00183

§ 371 Date: Nov. 6, 1997

§ 102(e) Date: Nov. 6, 1997

[87] PCT Pub. No.: WO96/31552

PCT Pub. Date: Oct. 10, 1996

[30] Foreign Application Priority Data

Apr. 6, 1995 [FI] Finland .................................. 951638

[51] Int. Cl.[6] .................................................. C08G 63/00
[52] U.S. Cl. ............................................ 528/271; 528/176
[58] Field of Search ...................................... 528/271, 176

[56] References Cited

U.S. PATENT DOCUMENTS 3,739,041 6/1973 Schmid et al. ........................... 525/438
5,380,813 1/1995 Seppälä et al. ......................... 528/58
5,470,944 11/1995 Bonsignore .............................. 528/354

OTHER PUBLICATIONS

English Language Abstract of JP-A-6032357.
English Language Abstract of JP-A-5342903.
English Language Abstract of JP-A-06239984.
Journal of Polymer Science: Part A: Polymer Chemistry, vol. 31, 1993, Storey et al., New Epoxy–Terminated Oligoesters: Precursors to Totally Biodegradable Networks, pp. 1825–1838.

*Primary Examiner*—Terressa Mosley
*Attorney, Agent, or Firm*—Birch, Stewart, Kolasch & Birch, LLP

[57] ABSTRACT

The invention concerns a novel melt-processible copolyester and a process and prepolymer for the preparation thereof. The copolyester contains structural units derived from a polyester and structural units derived from diepoxy, and the polyester units at least essentially consist of hydroxy acid monomers. The bonds between the structural units are ester bonds and the number average molar mass, $M_n$, is at least 10,000 g/mol, its weight average molar mass, $M_w$, is over 20,000 g/mol and molar mass distribution, expressed as the ratio $M_w/M_n$, is over 2. The copolyester is hydrolytically degradable and it can be used as a biodegradable polymer for the manufacture of injection moulded articles as well as thermoformed and blow moulded packages, pouches, sacks and bottles, for the coating of sacks bags and films made from paper or cardboard and for the preparation of fibres, fibre cloths and expanded polymer articles.

54 Claims, No Drawings

THERMOPLASTIC BIODEGRADABLE POLYESTER A PROCESS FOR THE PREPARATION THEREOF AND ARTICLES MANUFACTURED THEREFROM

The present invention relates to a process according to the preamble of claim 1 for preparing a thermoplastic, biodegradable polyester.

According to the process a lower molecular weight polyester-prepolymer is first formed from hydroxy acid monomers, and then the prepolymer is copolymerized with a monomer which reacts with its end groups in order to form a polymer having a high molecular weight.

The invention also relates to a copolyester according to the preamble of claim 21 and to a polyester according to the preamble of claim 39, which can be used as a precursor (prepolymer) for the preparation of the copolymer.

There are a number of applications for biodegradable polymers, such as expendable packings, paper coatings and compostable waste packages, wherein compostability significantly increases the competitiveness of the materials. The use of traditional biodegradable polymers in packages and in other bulk applications are, however, limited by the very high price of the polymers.

One specific group of biodegradable plastics comprises aliphatic polyesters, which are biologically degradable due to the presence of hydrolysable ester bonds. The polyesters are generally prepared from hydroxy acids or diacids and diols. Before the mechanical properties of the polymer are sufficiently good, its molar mass must be rather high, and the most common way of achieving a high molar mass is to manufacture the polyester by the ring-opening lactone mechanism.

Lactic acid is a potential raw material for biodegradable bulk polymers. The preparation of polylactide (PLA) by the ring-opening mechanism from lactic acid via an intermediate lactide stage produces polymers having high molar masses, but it requires several intermediate stages and a very pure feedstock, and the total yield of polymer from lactic acid is very low.

Structurally PLA is a straight-chained polyester, and no long-chain branching will take place. The rheological properties of straight-chained polyester melts impair their use in most preparation processes employing extrusion technology, such as blow moulding, film blowing and paper coating. These processing methods which require great strength and elasticity of the melt are, however, the most important manufacturing processes of the packaging industry.

Typically, straight condensation polymerization of aliphatic diols and diacids or hydroxy acids give rise to a number average molar mass of about 10,000 g/mol, at the most, and often, technically and economically, the sensible molar mass is about 2,000–5,000 g/mol.

A method is known in the art that makes it possible to prepare a high molar mass polyurethane suitable for melt-processing from lactic acid monomers. This method disclosed in FI Patent Application No. 924699 comprises preparing the polymer in two stages by first polymerizing the lactic acid to form an oligomer of lower molar mass, and then copolymerizing the oligomer with isocyanate to form a high molar mass polyurethane.

It is an object of the present invention to provide an alternative way of preparing melt-processible, hydroxy acid monomer based polymers with high molar masses, which are easily processed into desired shape. It is another object of the invention to provide a biodegradable polymer, wherein all or practically all hydrolysable bonds are comprised of ester bonds and which does not essentially contain any nitrogenous functions.

The invention is based on the idea of subjecting the lactic acid or another hydroxy acid or diacid and diol to a straight polycondensation reaction and then to raise the molar mass of the propolymer thus obtained by chemically coupling the chain ends of the polymers with the aid of diepoxy compounds. As a result, a thermoplastic biodegradable copolyester is obtained having a clearly higher molar mass than the prepolymer.

The process according to the invention substantially comprises two stages, the first stage consisting of preparing a prepolymer by polymerization of hydroxy acids to prepare in within a reasonable time span a carboxylic acid -terminated linear polyester while keeping the lactide formation small. The central parameters of the method are the polymerization temperatures, the profile of the temperature increase, the methods for removing condensation water, the comonomers and the catalysts. In the second stage of the method a high molar mass polyester is produced by raising the molar mass of the carboxylic acid -terminated prepolymer by using a diepoxy compound, such as 1,4-butanediol-diglycidyl ether. During this second stage the polymerization temperatures, the temperature gradient, the diepoxides used and their amounts (molar ratio of epoxy to-acid), the catalysts and the technical solutions for polymerization (melt polymerization) are important. Typically, the molar ratio between the diepoxy and the carboxylic acid groups of the terminal ends of the prepolymer is about 1:1.

More specifically, the process according to the invention is mainly characterized by what is stated in the characterizing part of claim 1.

The melt-processible copolyester according to the present invention contains structural units derived from a polyester and structural units derived from a diepoxy, the polyesters consisting at least essentially of repeating units derived from hydroxy acids, the units being derived from one or several monomer(s), the bonds between the structural units being at least mainly ester bonds. The number average molar mass, $M_n$, of the polymer is at least 10,000 g/mol and its weight average molar mass, $M_w$, is over 20,000 g/mol and its molar mass distribution expressed by the ratio $M_w/M_n$ is over 2. Preferably the number average molar mass is 10,000–200,000 g/mol, in particular about 15,000–100,000, the weight average molar mass is 20,000–1,000,000, in particular about 30,000–600,000 and its molar mass distribution is 2–20, preferably 3–12.

More specifically the copolyester of the present invention is therefore characterized by what is stated in the characterizing part of claim 21.

The polyester-prepolymer used for the preparation of the melt-processible copolyester contains structural units derived from hydroxy acids, such as α-hydroxy acids, and, possibly, structural units derived from organic diacids or cyclic acid anhydrides which are attached to each other so that the terminal end groups of the polyester at least substantially consist of carboxylic acid groups. This means that all or at least nearly all terminal hydroxylic groups have been converted to carboxylic acids. The number average molar mass of the polyester lies in the range of 500 to 20,000, preferably about 1,000 to 8,000 g/mol, its lactone concentration is less than 10 wt-% and the amount of free hydroxy acid is less than 10 wt-%.

More specifically the prepolymer according to the invention is characterized by what is stated in the characterizing part of claim 39.

By reacting an above described polyester-prepolymer with a diepoxy compound a new copolyester is obtained which has highly advantageous properties:

The polymer is biodegradable (that is, it decomposes in biological environment typically under the influence of microorganisms) and it can be composted, The polymer is termoplastically processible and its mechanical properties are sufficiently good for many practical applications. The following examples of the polymer's applications can be mentioned:

injection moulded articles, thermoformed and blow moulded packages and bottles, the use of the polymer for extrusion coating of paper or cardboard, and sacks, bags and films manufactured from paper or cardboard coated with the polymer, packages, bags and sacks manufactured from blow moulded or planar films, foams and articles manufactured from foams, fibres and non-woven -articles, the use of the polymer as a coating or a matrix of, e.g., controllably released fertilizers or medicines as well as the use of the polymer in the form of dispersions, for example, in adhesives or binders.

The raw material costs are very close to the price of the hydroxy acid, because the hydroxy acid stands for some 95 mol-% of the total yield of the copolyester.

A further advantage obtainable by the invention is that the present method makes it possible to adjust the molar mass distribution, the long-chain branching and the cross-linking of the copolyester, whereby controlled rheological properties of the polymer melt can be obtained.

The monomer or lactone concentration of the copolyester according to the invention is very small (typically less than 3 mol-% or even 2 mol-%). This is due to the fact the last coupling reaction is not an equilibrium reaction as the esterification reaction, which leaves a considerable amount of the feedstock unreacted, but the coupling reaction consumes the free functional groups.

The polymerization process is relatively simple and existing polyester processes can easily be utilized. By means of the method not only aliphatic copolyesters can be prepared but also aromatic copolyesters. According to one particularly preferred embodiment aromatic hydroxy acid monomers are polymerized or they are copolymerized with aliphatic hydroxy acid monomers in order to prepare a polyester-prepolymer. The use of aromatic monomers, such as mandelic acid or p-hydroxy benzoic acid, stiffens the polymer chain which, again, increases the glass transition temperature ($T_g$) of the polymer. Furthermore, the introduction of aromatics into the biodegradable polymer has not been found in any way to be detrimental to the hydrolyzability of the polymer.

Next, the invention will be more closely examined with the aid to the following detailed description and with the help of some working examples.

The preparation of the prepolymer

Depending on the amount of the starting compounds, the polyester-prepolymer consists typically of 80 to 99.9% of hydroxy acid monomers and 20 to 0.1% of diacid monomers or cyclic acid anhydrides. If so desired, the carboxylic acid -terminated polyester-prepolymer can be prepared from a hydroxy-terminated polyester-prepolymer. This situation may arise when the same prepolymer batch is to be used for the preparation both of copolyesters and polyurethanse. For the preparation of hydroxyl-terminated polyesters diols are typically used, the amount of which in the present prepolymer can be 10 to 0%. The above mentioned procentual amounts have been calculated from the total molar amount of the polymer.

According to the invention, the hydroxy acid monomers used for preparing the prepolymer are typically selected from α-hydroxy acids, β-hydroxy acids and lactones. Particularly preferred are aliphatic or aromatic α-hydroxy acid monomers, such as L-lactic acid, D-lactic acid and mixtures thereof (e.g. racemic D,L-lactic acid), glycolic acid, L- or D-mandelic acid, α-hydroxy-isobutanoic acid, lactide or mixtures thereof, whereat the concentration of lactones is 10% of the polymer weight, at the most. The hydroxy acid monomers can also be multifunctional. These monomers are exemplified by maleic acid.

Preferably the polyester-prepolymer is produced from lactic acid monomers which, if desired, can be copolymerized with other aliphatic or aromatic hydroxy acid monomers. By copolymerizing lactic acid with, e.g., mandelic acid, the glass transition temperature of the prepolymer chain can be raised. The stiffness of the polyester chain can be increased by copolymerization of hydroxy acid monomers with aromatic compounds so that the aromatic structure forms a part of the main chain. Examples of suitable compounds include aromatic diols, aromatic diacids and hydroxy acids, such as hydroquinone, terephthalic acid and para-hydroxybenzoic acid.

The hydroxy acid monomers are commercial products and readily available. Thus, e.g., monomeric lactic acid can be prepared from glucose by fermentation. The lactic acid does not have to be pure, but it can contain reactive sugar residues with partially bond to the polymer forming a part thereof.

The preparation of the prepolymer, i.e. the condensation polymerization of lactic acid, can be carried out in any apparatus suitable for esterification reaction. According to one preferred embodiment, polyesterification is carried out as bulk polymerization in the melt phase, whereby water formed as a condensation product can be removed by introducing dry inert gas into the polymer melt while stirring. The removal of the water can also be enhanced by using reduced pressure, the pressure of the reaction being gradually decreased.

In the examples below, the polyester was prepared on laboratory scale with an equipment of the "Rotavapor" type, which makes it possible continuously to remove water.

Preferably polyesterification is carried out in the presence of a catalyst. According to one particularly preferred embodiment, the catalysts used are typical polyesterification catalysts. Catalysts of this kind are, e.g., alkyl or alkoxy compounds of tin or titanium, such as Sn(II)octoate.

The growth rate of the molar mass of the polyesterification product depends on the polymerization temperature. When the polymerization temperature increases above 210° C. polymer chain degradation limits the polymerization temperature. The formation of a detrimental side product, i.e. lactide, also significantly increases at temperatures over 220° C. For the above-mentioned reasons the temperature of the polyesterification is preferably gradually increased within the temperature range of 140 to 200° C. at a rate of 5 to 50° C. per hour and within the temperature range of 200 to 230° C. with a rate of 0 to 30° C. per hour.

According to one preferred embodiment the initial temperature of the polyesterification is about 160° C., and the temperature is then gradually increased to 210° C. The pressure is correspondingly decreased within the range of 220 to 40 mbar, and the condensation product continuously removed with the aid of nitrogen. By the afore-mentioned standard procedure a polyester-prepolymer is obtained which has a number average molar mass of about 2,000 to 8,000 g/mol (e.g., about 6,000 g/mol) and a polydispersity of about 1.7.

At the final stage of the polyesterification, the low molar mass fraction can be removed, if desired, by reducing the pressure of the reaction mixture, whereby said fraction distils off.

Functionalization of the chain ends of the prepolymer

The diepoxy used as a coupling agent for the polyesters reacts best with carboxylic groups. Normally, when hydroxy acid is polymerized, one end of the chain is formed by a carboxylic group and the other by a hydroxylic group. The coupling of such a prepolymer with diepoxy has turned out to be difficult and excessive cross-linking has been problematic. According to the present invention the problem has been solved by preparing a prepolymer, wherein there are carboxy groups in both ends of the polymer chain.

The carboxylic acid terminated prepolymer according to the invention can be obtained by methods known per se. Preferably the carboxylic termination is, however, achieved by adding as a starting compounds 0.1 to 10 mol-%, preferably about 0.5 to 5 mol-%, diacid. Another preferred way of acid termination is to convert the hydroxylic end groups of the prepolymer to carboxylic acids with the aid of a cyclic anhydride. The diacids used can comprise aliphatic or aromatic acids, such as succinic acid, adipic acid or phthalic or terephthalic acid. Succinic anhydride, glutaric anhydride and phthalic anhydride are examples of cyclic acid anhydride monomers.

The molar ratio of the carboxylic and hydroxylic groups of monomers which are to be copolymerized during carboxy-termination is kept at more than 1.

Characterization of the prepolymer

The obtained prepolymer is a brittle, colourless, translucent and amorphous material. The molar mass of the functionalized polyester is lower than that of an unfunctionalized polyester. The propolymer has a distinct glass transition point ($T_g$) at about 40° C., which can be seen from the DSC graph. No crystallinity can be noticed. In comparison with poly-L-lactide, the prepolymer according to the invention has a glass transition point, $T_g$, which is of the same order as that of PLLA of corresponding molar mass, but the polyester does not contain any of the crystallinity which is typical for PLLA, at least not immediately after polymerization.

The lactic acid is condensation polymerized, L-lactide being formed by a side reaction. In connection with the polymerization method according to the invention, less than 1% lactide, based on the weight of the feedstock, is sublimed in the collecting vessels for the condensation product, but $^1$H-NMR analysis show that the products always contain minor amounts of L-lactide. Typically, the lactide concentration is, however, smaller than 10 wt-% (e.g. about 3 to 5%) and the concentration of free lactic acid is, similarly, less than 10 wt-%. The polyester contains 0 to about 0.5 wt-% of the polyesterification catalyst.

Unless otherwise specifically indicated, the molar masses of the prepolymer have been determined by the GPC method using polystyrene standards as references. In some of the examples, the molar masses of the prepolymer have also been measured by the $^{13}$C-NMR method in order to determine the concentrations of the terminal groups.

By suitable adjustments of the polyesterification and functionalization conditions, the number average molar mass of the prepolymer can be set at 500 to 20,000; preferably it is about 1,000 to 8,000 g/mol. Typically the molar mass of the polyester-prepolymer produced by condensation polymerization is about 2,000 to 5,000 g/mol. A low molar mass is advantageous for obtaining long-chain branching of the polyester.

Preparation of the copolyester

The copolyester is prepared by attaching the polymer chains of the prepolymer to each other by using coupling agents which react with the functional groups (carboxylic groups) at the terminal ends of the chains. According to the invention it is possible to prepare a biodegradable copolyester having a high molar mass from the COOH-terminated prepolymer and diepoxy compounds at relatively short polymerization times. The coupling reaction, which in the following also is called "copolymerization", is preferably carried out in the melt phase as mass polymerization. The diepoxy compounds used preferably comprise aliphatic or cycloaliphatic diepoxy compouns, such as glycidyl ethers. Specific examples include 1,4-butanedioldiglycidyl ether and 3,4-epoxycyclohexylmethyl-3,4-epoxycyclohexane carboxylate (CHD).

The reaction can be carried out in the presence of a catalyst. Preferred catalysts include alkaline catalysts, such as tertiary aliphatic or aromatic amines, ammonium salts, alkaline metal hydroxides and alkaline metal hydroxides and alkaline metal acetates. Particularly preferred catalysts comprise benzyldimethyl amine, dodecyl-dimethyl amine, tributyl amine, KOH and NaAc. By using an alkaline catalyst it is possible to reduce the reaction between the hydroxyl groups and the epoxy groups while, at the same time, enhancing the reaction between the carboxylic acid groups and epoxy groups, which is the main reaction. When diepoxy is used as a coupling agent, internal hydroxy groups are formed in the chain between two esters which are capable of reacting with the diepoxy compounds in the reaction mixture, which may give rise to branching and cross-linking of the chains.

The amount of the catalyst is 0.01 to 10%, preferably 2% at the most, calculated from the total weight of the reaction mixture.

During copolymerization the molar ratio between the epoxy groups of the diepoxy and the carboxylic groups of the polyester is typically 0.5 to 1.5, e.g., 0.7 to 1.2, preferably about 1. The molar ratio between the diepoxy and the carboxylic groups of the polyester can also be over 1, preferably about 1.2 to 1.5, if an at least partially cross-linked product is to be provided. The cross-linked product can also be achieved by continuing the polymerization long enough and by carrying out the polymerization at a sufficiently high temperature and by using an acid catalyst.

The copolymerization is carried out at a temperature of about 110 to 220° C., preferably 130 to 200° C., and the copolymerization is continued until the obtained copolyester is at least essentially free from free epoxy groups. Preferably the copolymerization is continued until the molar mass distribution, expressed as the ratio $M_w/M_n$, of the copolyester obtained is at least 2.

On a laboratory scale the copolymerizations have been carried out as mass polymerizations in a 300 ml glass reactor in an argon atmosphere. The mixer comprises a blade mixer suitable for viscous masses and the coupling temperatures employed have been 150° C. and 180° C. The progress of the coupling reaction has been monitored by taking samples from the polymerization mixture each 15 minute. The reaction times were 1 min–100 h, preferably about 1–50 h.

Properties of the Polymer

The number average molar mass of the coupled polymer is 10,000–200,000 g/mol, typically about 20,000–40,000. The molar mass distributions of polymers prepared from lactic acid and glycolic acid are generally broad, but narrow molar mass distributions are obtainable by copolymerization of these monomers with other hydroxy acids, such as mandelic acid, α-hydroxy-isobutane acid or maleic acid.

Long-chain branching and a broadening of the molar mass distributions, in particular an increase of the proportion of long polymer chains, generally influences the melt processing properties of the polymer, resulting in an increase of the elasticity and strength of the melt. These properties are advantageous in particular when processing methods employing extrusion methods are used, such as in connection with paper coating and film preparation.

The concentration of free hydroxy acid monomers and lactides is 3%, at the most, of the weight of the polymer.

The polymer is melt-processible, the viscosity of the polymer melt being in the range from 10 to 5,000 Pa s, preferably 50 to 2.000 Pa s, measured by capillary rheometry at a temperature of 200° C. at a shear rate of 200 1/s.

The prepolymer and the polymer obtained as the end product are both amorphous, which means that their highest temperature of use is about 50° C.

One requisite of biodegradation is that the polymer is hydrolytically degradable. A widely accepted belief is that hydrolysis in an aqueous environment is the primary mechanism of degradation in case of polymers manufactured from, in particular, lactic acid. Hydrolysis is the introductory step of biodegradation which makes it possible for the microorganisms easier to degrade the low molar mass hydrolysis products.

As the below examples (cf. Example 26) will show, the copolyester according to the invention is hydrolytically decomposable, and its weight average molar mass is reduced to half at a hydrolysis temperature of 37° C. at pH 7 within a maximum of 100 days.

The mechanical properties of the products of the coupling polymerization have also been determined. These results are examined in more detail in Example 1. In the present connection it suffices to note that the tensile strength and stiffness of the polymer are very good.

Blending, filling and reinforcing of the copolyesters

The new copolyesters can be melt-blended with other melt-processible polymers (e.g. thermoplastics), whereby, depending on the blending proportions either the properties of the novel copolyester or those of the other polymer are modified. As examples of polymers, which can be melt-blended with the copolyester, polyesters and polyolefins can be mentioned, which will affect, for example, the biodegradability of the polymer blend. The heat resistance of the copolyester can be improved, for example, melt-blending it with poly(ethylene terephthalate) (PET).

The new polyester can also be filled or reinforced with fillers or reinforcing agents, which makes it possible, for example, to increase the heat resistance of the copolyester, to improve the mechanical properties or to decrease the costs thereof. Suitable fillers are, for example, chalk or talc. Suitable reinforcing agents are, e.g., cellulosic fibres or hemp.

Applications of the copolyesters

Thanks to the long chain branching of the polymer the novel polyesters are particularly well suited for coating of paper and cardboard, which for technical reasons nowadays is being made of LD-polyethylene containing long chain branches.

The novel polymers have a broad application range. Thus, they can be used for the preparation of injection moulded articles and thermoformed and blow moulded packages, bags, sacks and bottles. The polymers can be used as coatings for sacks, bags and films manufactured from paper and cardboard. They can be shaped into blow moulded or planar films, which can be utilized for manufacturing packages, bags and sacks. The polymers can also be used for the preparation of fibres and fabrics (non-woven -products). Expanded plastic products, cellular plastic and foams, suitable for, e.g., package filings, can be prepared from them. Finally, they are suitable as coating or matrices for controllably released fertilizers, pesticides, insecticides and medicines.

For all the above mentioned applications, the unique properties of the novel copolyesters, involving the combination of biodegradability and good mechanical properties, can be utilized.

The following examples will describe the invention in more detail:

Examples of the preparation of an acid-terminated prepolymer

EXAMPLE 1

The preparation of an acid-terminated poly(lactic acid) prepolymer by using a stoichimetric excess of carboxylic groups by adding cylic anhydride at the beginning of the polymerization As a reactor, a 2 liter "Rotavapor"-type rotatory evaporator was employed. 450 g L-lactic acid, 10.0 g succinic anhydride and 0,25 g stannous octoate were introduced into the reactor. Dry nitrogen was fed below the liquid surface of the reaction mixture and the reactor was evacuated to an absolute pressure of 230 mbar. The reaction vessel was partly immersed into an oil bath having a temperature of 160° C., and the reaction mixture was mixed by starting the rotation at a speed of 100 rpm. The temperature of the oil bath was increased steadily at a rate of 20° C./h up to a temperature of 200° C., and furtheron at a rate of 5° C./h to a temperature of 210° C. Then polymerization was continued for a further 20 hours in the oil bath at a temperature of 210° C., the total polymerization time amounting to 24 h. The pressure was lowered after one hour of polymerization to a pressure of 170 mbar and then with one hour-intervals to 130 mbar, 100 mbar, 80 mbar, 60 mbar, 50 mbar and 40 mbar. The pressure was 40 mbar at the end of the polymerization. During the whole polymerization dry nitrogen was bubbled below the surface of the reaction mixture. The condensed water formed during polymerization was recovered as it was formed.

The molar mass of the polymer obtained was analyzed on a GPC apparatus (Gel Permeation Chromatography) and the number average molar mass was determined as being 5,990 g/mol in comparison to polystyrene standards, and the polydispersity 1,9. The acid number was 30. $^{13}$C-NMR analysis showed that the terminal groups of the polymer chains were almost completely (over 90%) carboxy groups and the polymer contained 3.6 wt-% L-lactide and 1.3 wt-% L-lactic acid. DSC-analysis (Differential Scanning Calorimetry) indicated that the glass transition temperature of the polymer was 44.4° C. and no crystalline melting peaks were noticed, which means that the polymer is entirely amorphous.

EXAMPLE 2

Preparation of an acid-terminated poly(lactic acid) prepolymer by using a stoichiometric excess of carboxylic acid groups by adding a cyclic acid anhydride at the beginning of the polymerization The polymerization was carried out as in Example 1, but the polymerization time was altogether 16 hours.

The molar mass of the obtained polymer was analysed by GPC and the number average molar mass was found to be 4,500 g/mol compared with polystyrene standards, and the polydispersity was 1.89. The acid number was 33. $^{13}$C-NMR analysis and titration of the acid number indicated that the main part of the terminal groups of the polymer chains were carboxylic acid groups and that the polymer contained 4.2 mol-% lactide and 2.0 mol-% lactic acid. DSC-analysis showed that the glass transition temperature of the polymer was 45.1° C. and that the polymer was entirely amorphous.

EXAMPLE 3

Preparation of an acid-terminated poly(lactic acid) prepolymer by using a stoichiometric excess of carboxylic acid groups by adding an aliphatic diacid at the beginning of the polymerization The polymerization was carried out as in Example 1, but instead of succinic anhydride 14.6 g (2 mol-%) of adipic acid was used and the polymerization time was 10 hours in all.

The molar mass of the obtained polymer was analysed by GPC and the number average molar mass was found to be 2,950 g/mol compared with polystyrene standards, and the polydispersity was 1.98. $^{13}$C-NMR analysis and titration of the acid number indicated that the terminal groups of the polymer chains were mainly carboxylic acid groups and that the polymer contained 3.9 mol-% lactide and 0.9 mol-% lactic acid. DSC-analysis showed that the glass transition temperature of the polymer was 39.9° C. and that the polymer was entirely amorphous.

EXAMPLE 4

Preparation of an acid-terminated poly(lactic acid) prepolymer of lower molar mass by using a stoichiometric excess of carboxylic acid groups and by adding an aliphatic diacid at the beginning of the polymerization The polymerization was carried out as in Example 2, but the adipic acid was used in an amount of 29.2 g (4 mol-%) and the polymerization time was 13 hours, in all.

The molar mass of the obtained polymer was analysed by GPC and the number average molar mass was found to be 1,530 g/mol, compared with polystyrene standards, and the polydispersity was 1.84. The acid number was 75. $^{13}$C-NMR analysis and titration of the acid number indicated that the terminal groups of the polymer chains were mainly carboxylic acid groups and that the polymer contained 3.8 mol-% lactide and less than 1 mol-% lactic acid. DSC-analysis showed that the glass transition temperature of the polymer was 34.8° C. and that the polymer was entirely amorphous.

EXAMPLE 5

Preparation of an acid-terminated prepolymer by converting the hydroxyl end groups of a prepolymer into carboxylic acids with the aid of a cyclic acid anhydride L-lactic acid was polymerized as described in Example 1, but no succinic anhydride was added and the polymerization time was 10 hours, in all. The molar mass of the obtained polymer was analysed by GPC and the number average molar mass was found to be 5,300 g/mol, compared with polystyrene standards, and the polydispersity was 2.1. The acid number was 23. $^{13}$C-NMR analysis and titration of the acid number indicated that the terminal groups of the polymer chains were 1:1 hydroxyl groups and carboxylic groups.

In the next stage, 10.9 g succinic acid anhydride and 0.3 g benzyldimethyl amine, as a catalyst, were added to 300 g of melt polymer. The mixture was reacted at 150° C. for 2 h. The molar ratio between the succinic anhydride and the OH end groups was estimated as being 1:1.

The molar mass of the polymer obtained after the anhydride addition was analysed by GPC and the number average molar mass was found to be 4,400 g/mol, compared with polystyrene standards, the polydispersity was 2.5 and the acid number was 40. $^{13}$C-NMR analysis and titration of the acid number indicated that the terminal groups of the polymer chains were mainly carboxylic groups and that the polymer contained 2.0 mol-% lactide and less than 1 mol-% lactic acid. DSC-analysis showed that the glass transition temperature of the polymer was 46.7° C. and that the polymer was entirely amorphous.

EXAMPLE 6

Preparation of an acid-terminated prepolymer by converting the hydroxyl end groups of a hydroxyl-terminated prepolymer into carboxylic acids with the aid of a cyclic acid anhydride and by using 1-methyl imidazole as a catalyst L-lactic acid was polymerized as described in Example 1, but instead of succinic anhydride 9.0 g of 1,4-butane diol was added to the reaction mixture and the polymerization time was 10 hours, in all. The molar mass of the obtained polymer was analysed by GPC and the number average molar mass was found to be 5,200 g/mol, compared with polystyrene standards, and the polydispersity was 1.9. $^{13}$C-NMR analysis and titration of the acid number showed that the polymer contained 4.0 mol-% lactid and 4.5 mol-% lactic acid.

In the next stage, 2.0 g succinic acid anhydride and 0.12 g 1-methylimidazole, as a catalyst, were added to 40 g of melt polymer. The mixture was allowed to react at 150° C. for 1 h. The molar ratio between the succinic anhydride and the OH end groups was estimated as being 1:1.

The molar mass of the polymer obtained after the anhydride addition was analysed by GPC and the number average molar mass was found to be 4,700 g/mol, compared with polystyrene standards, the polydispersity was 2.0. $^{13}$C-NMR analysis and titration of the acid number indicated that the terminal groups of the polymer chains were mainly carboxylic groups and that the polymer contained 4.0 mol-% lactide and less than 1 mol-% lactic acid. DSC-analysis showed that the glass transition temperature of the polymer was 40.2° C. and that the polymer was entirely amorphous.

EXAMPLE 7

Preparation of an acid-terminated prepolymer from D,L-lactic acid

Polymerization was carried out as described in Example 1, but instead of L-lactic acid DL-lactic acid (D:L=1:1) was used as a feed stock and the total polymerization time was 14 h.

The molar mass of the obtained polymer was analysed by GPC and the number average molar mass was found to be 3,090 g/mol, compared with polystyrene standards, and the polydispersity was 1.84. The acid number was 43. $^{13}$C-NMR analysis and titration of the acid number indicated that the terminal groups of the polymer chains were mainly carboxylic groups and that the polymer contained 2.9 mol-% lactide and less than 1 mol-% lactic acid. DSC-analysis showed that the glass transition temperature of the polymer was 39.5° C. and that the polymer was entirely amorphous.

EXAMPLE 8

Preparation of a acid-terminated prepolymer from lactic acid and glycolic acid

Polymerization was carried out as described in Example 1, but instead of pure L-lactic acid 360 g L-lactic acid and 76.1 g glycolic acid were used as hydroxy acid monomers and the total polymerization time was 14 h.

The molar mass of the obtained polymer was analysed by GPC and the number average molar mass was found to be 2,260 g/mol, compared with polystyrene standards, and the polydispersity was 2.17. The acid number was 47. $^{13}$C-NMR analysis and titration of the acid number indicated that the terminal groups of the polymer chains were mainly carboxylic groups and that the polymer contained 3.4 mol-% lactide and less than 1 mol-% lactic acid. DSC-analysis showed that the glass transition temperature of the polymer was 42.3° C. and that the polymer was entirely amorphous.

EXAMPLE 9
Preparation of a acid-terminated prepolymer from mandelic acid

Polymerization was carried out as described in Example 1, but instead of pure L-lactic acid 405 g L-lactic acid and 76.1 g DL-mandelic acid were used as hydroxy acid monomers and the total polymerization time was 15 h.

The molar mass of the obtained polymer was analysed by GPC and the number average molar mass was found to be 1,680 g/mol, compared with polystyrene standards, and the polydispersity was 1.2. The acid number was 62. $^{13}$C-NMR analysis and titration of the acid number indicated that the terminal groups of the polymer chains were mainly carboxylic groups and that the polymer contained 3.4 mol-% lactide and less than 1 mol-% lactic acid. DSC-analysis showed that the glass transition temperature of the polymer was 45.3° C. and that the polymer was entirely amorphous.

EXAMPLE 10
Preparation of a acid-terminated prepolymer from lactic acid and α-hydroxy isobutanoic acid Polymerization was mainly carried out as described in Example 1, but instead of pure L-lactic acid 360 g L-lactic acid and 52.1 g α-hydroxy isobutanoic acid were used as hydroxy acid monomers and the total polymerization time was 13 h. Furthermore, the temperature profile of the polymerization was as indicated in Example 1, but the pressure was decreased after one hour of polymerization to 180 mbar, at which value it was kept for the following 7 hours. Then the pressure was gradually decreased during 4 hours' time to 50 mbar, which pressure was maintained during the last hour. As a result, the unreacted monomers were substantially distilled off from the reaction vessel during the five last hours of the polymerization.

The molar mass of the obtained polymer was analysed by GPC and the number average molar mass was found to be 2,980 g/mol, compared with polystyrene standards, and the polydispersity was 1.5. The acid number was 51. $^{13}$C-NMR analysis and titration of the acid number indicated that the terminal groups of the polymer chains were mainly carboxylic groups and that the polymer contained 2.9 mol-% lactide and less than 1 mol-% lactic acid. DSC-analysis showed that the glass transition temperature of the polymer was 34.4° C. and that the polymer was entirely amorphous.

EXAMPLE 11
Preparation of an acid-terminated prepolymer from lactic acid and maleic acid The polymerization was carried out as in Exampe 1, but 450 g of L-lactic acid, 10.0 g of succinic acid anhydride and 3.35 g of maleic acid (apple acid) were used as feedstock and the total polymerization time was 14 h.

The molar mass of the obtained polymer was analysed by GPC and the number average molar mass was found to be 1,330 g/mol, compared with polystyrene standards, and the polydispersity was 1.2. $^{13}$C-NMR analysis and titration of the acid number indicated that the terminal groups of the polymer chains were mainly carboxylic groups and that the polymer contained 3.4 mol-% lactide and less than 1 mol-% lactic acid. The acid number was 55. DSC-analysis showed that the glass transition temperature of the polymer was 44.0° C. and that the polymer was entirely amorphous.

Examples on the preparation of copolyesters by using diepoxy compounds

EXAMPLE 12
Coupling polymerization of an acid-terminated prepolymer with diepoxy and the properties of a copolyester thus prepared measured from, e.g., from a melt-processed, compression moulded sheet 50 g of a prepolymer prepared according to Example 1 from L-lactic acid and succinic anhydride were metered into a 300 ml glass reactor. The acid number of the prepolymer was 30 mg/g. An argon stream was conducted into the reactor and the temperature was adjusted to 150° C. Once the polymer had melted mixing was started and 2,2 ml butanediol-diglycidyl ether was added into the polymer melt, the ratio between the terminal acid groups of the prepolymer and the epoxy groups being 1:1. The catalyst used comprised 0.1 wt-% benzyldimethyl amine (BDMA). The polymerization time was 1.5 h.

The polyester obtained as an end product had a number average molar mass, determined by GPC with comparison to polystyrene standards, of 28,000 g/mol and a weight average molar mass of 270,000 g/mol. The molar mass distribution of the polymer was very broad. The glass transition temperature of the amorphous polymer, measured by DSC, was 45.8° C. It appeared from a $^{13}$C-NMR-analysis that the polymer contained less than 2 mol-% lactide and less than 1 mol-% lactic acid. Test specimens sawn out from compression moulded sheet (2 mm–9 mm–50 mm) had a tensile strenght of 12 MPa, an tensile elasticity module of 1970 MPa and an elongation at break of 1%.

EXAMPLE 13
Coupling polymerization of an acid-terminated prepolymer with a diepoxy compound using potassium hydroxide as a catalyst The coupling polymerization was carried out as described in Example 11, but instead of benzyldimethyl amine 0.05 g of potassium hydroxide (KOH) was used as a catalyst and the prepolymer comprised the prepolymer made according to Example 2. The polymerization time was 1.5 h The polyester obtained as an end product had a number average molar mass, as determined by GPC using polystyrene standards as reference, of 37,700 g/mol and a weight average molar mass of 123,000 g/mol. The molar mass distribution of the polymer was relatively broad and its polydispersity was 3.3. The amorphous polymer had a glass transition temperature, determined by DSC, of 47.1° C.

EXAMPLE 14
Coupling polymerization of an acid-terminated prepolymer with diepoxy using an alicyclic diepoxy compound The coupling polymerization was carried out as described in Example 12 but instead of butanediol-diglycidyl ether, 3,2 ml 3,4-epoxy cyclohexylmethyl-3,4-epoxycyclohexane carboxylate was used as diepoxy compound, the molar ratio between the epoxy groups and the carboxylic acid groups of the prepolymer was 1:1.

The polyester obtained as an end product had a number average molar mass, as determined by GPC using polystyrene standards as reference, of 24,700 g/mol and a weight average molar mass of 51,600 g/mol. The molar mass distribution of the polymer was relatively narrow and its polydispersity was 2.09. The glass transition temperature of the amorphous polymer, determined by DSC, was 55.6° C.

EXAMPLE 15
Coupling polymerization of an acid-terminated prepolymer with diepoxy using sodium acetate as a catalyst and an alicyclic diepoxy compound The coupling polymerization was carried out as described in Example 14, but instead of potassium hydroxide 0.05 g sodium acetate (NaAc) was used as a catalyst and the prepolymer comprised the prepolymer made according to Example 2.

The polyester obtained as an end product had a number average molar mass, as determined by GPC using polystyrene standards as reference, of 226,000 g/mol and a weight average molar mass of 123,000 g/mol. The molar mass distribution of the polymer was very broad and its polydispersity was 11.7. The glass transition temperature of the amorphous polymer, determined by DSC, was 55° C.

EXAMPLE 16
Coupling polymerization of an acid-terminated prepolymer at a higher temperature The coupling polymerization was carried out as described in Example 12 but the temperature was 180° C.

The polyester obtained as an end product had a number average molar mass, determined by GPC using polystyrene standards as reference, of 31,000 g/mol and a weight average molar mass of 253,000 g/mol. The molar mass distribution of the polymer was comparatively narrow and its polydispersity was 8.2. The glass transition temperature of the amorphous polymer, determined by DSC, was 45.5° C.

EXAMPLE 17
Coupling polymerization of a diacid-terminated prepolymer

The coupling polymerization was carried out as described in Example 12 but the prepolymer used comprised the polyester prepared according to Example 3.

The polyester obtained as an end product had a number average molar mass, determined by GPC using polystyrene standards as reference, of 11,500 g/mol and a weight average molar mass of 32,000 g/mol. The glass transition temperature of the amorphous polymer, determined by DSC, was 36.6° C.

EXAMPLE 18
Coupling polymerization of a diacid-terminated, lower molar mass prepolymer The coupling polymerization was carried out as described in Example 12 but the prepolymer used comprised the polyester prepared according to Example 4.

The polyester obtained as an end product had a number average molar mass, determined by GPC using polystyrene standards as reference, of 17,700 g/mol and a weight average molar mass of 96,800 g/mol. The molar mass distribution of the polymer was rather broad and its polydispersity was 5.5. The glass transition temperature of the amorphous polymer, determined by DSC, was 33.2° C.

EXAMPLE 19
Coupling polymerization of a prepolymer acid-terminated afterwards with an anhydride The coupling polymerization was carried out as described in Example 12 but the prepolymer used comprised the polyester prepared according to Example 5.

The polyester obtained as an end product had a number average molar mass, determined by GPC using polystyrene standards as reference, of 13,500 g/mol and a weight average molar of 146,000 g/mol. The molar mass distribution of the polymer was broad and multimodal and the polydispersity was 11.2. The glass transition temperature of the amorphous polymer, determined by DSC, was 41.3° C.

EXAMPLE 20
Coupling polymerization of a prepolymer acid-terminated afterwards with an anhydride The coupling polymerization was carried out as described in Example 12 but the prepolymer used comprised the polyester prepared according to Example 6.

The polyester obtained as an end product had a number average molar mass, determined by GPC using polystyrene standards as reference, of 14,500 g/mol and a weight average molar mass of 32,000 g/mol. The molar mass distribution of the polymer was, therefore, rather narrow. The glass transition temperature of the amorphous polymer, determined by DSC, was 36.3° C.

EXAMPLE 21
Coupling polymerization of an acid-terminated prepolymer prepared from DL-lactic acid The coupling polymerization was carried out as described in Example 12 but the prepolymer used comprised the polyester prepared according to Example 7.

The polyester obtained as an end product had a number average molar mass, determined by GPC using polystyrene standards as reference, of 15,000 g/mol and a weight average molar mass of 187,000 g/mol. The molar mass distribution of the polymer was very broad and its polydispersity was 12.5. The glass transition temperature of the amorphous polymer, determined by DSC, was 37.0° C.

EXAMPLE 22
Coupling polymerization of an acid-terminated prepolymer prepared from lactic acid and glycolic acid The coupling polymerization was carried out as described in Example 12 but the prepolymer used comprised the polyester prepared according to Example 8.

The polyester obtained as an end product had a number average molar mass, determined by GPC using polystyrene standards as reference, of 23,000 g/mol and a weight average molar mass of 270,000 g/mol. The molar mass distribution of the polymer was very broad and its polydispersity was 11.7. The glass transition temperature of the amorphous polymer, determined by DSC, was 41.0° C.

EXAMPLE 23
Coupling polymerization of an acid-terminated prepolymer prepared from lactic acid and mandelic acid The coupling polymerization was carried out as described in Example 12 but the prepolymer used comprised the polyester prepared according to Example 9.

The polyester obtained as an end product had a number average molar mass, determined by GPC using polystyrene standards as reference, of 10,500 g/mol and a weight average molar mass of 29,400 g/mol. The molar mass distribution of the polymer was rather narrow. The glass transition temperature of the amorphous polymer, determined by DSC, was 44.5° C.

EXAMPLE 24
Coupling polymerization of an acid-terminated prepolymer prepared from lactic acid and α-hydroxy isobutane acid The coupling polymerization was carried out as described in Example 12 but the prepolymer used comprised the polyester prepared according to Example 10.

The polyester obtained as an end product had a number average molar mass, determined by GPC using polystyrene standards as reference, of 11,000 g/mol and a weight average molar mass of 33,000 g/mol. The molar mass distribution of the polymer was rather narrow and its polydispersity was 3.0. The glass transition temperature of the amorphous polymer, determined by DSC, was 39.2° C.

EXAMPLE 25
Coupling polymerization of an acid-terminated prepolymer prepared from lactic acid and maleic acid The coupling polymerization was carried out as described in Example 12 but the prepolymer used comprised the polyester prepared according to Example 11.

The polyester obtained as an end product had a number average molar mass, determined by GPC using polystyrene standards as reference, of 21,000 g/mol and a weight average molar mass of 50,700 g/mol. The molar mass distribution of the polymer was rather narrow. The glass transition temperature of the amorphous polymer, determined by DSC, was 41.1° C.

EXAMPLE 26

Hydrolytic degradation of the copolyester

The copolyester according to Example 16 was hydrolyzed at a temperature of 60° C. at pH 7 in a buffered aqueous solution. After one day, the number average molar mass of the polymer was 28,000 g/mol, its weight average molar mass 44,000 g/mol, the pH of the solution 7 and the dried sample had not lost weight. After 10 days of hydrolyzation the number average molar mass was 5,000 g/mol, its weight average molar mass was 6,000 g/mol, the pH of the solution 2.5 and the dry weight of the sample had decreased by 40%.

EXAMPLE 27

Melt-processing properties of the polyester

The viscosity of the melt of the copolyester according to Example 12 was measured by capillary rheometry at a temperature of 180° C., which showed that the polymer was melt-processible. The polymer could be used for compression moulding of polymer sheet at a temperature of 130° C.

Comparative Example

Coupling of a hydroxyl-terminated prepolymer

The coupling polymerization was carried out as described in Example 12, but the prepolymer comprised a hydroxyl-terminated prepolymer having a molar mass of 4,500 g/mol and the polymerization temperature was 180° C. The prepolymer was prepared according to Example 2, with the exception that 9.0 g 1,4-butane diol was used instead of adipic acid.

The polyester obtained as an end product had a number average molar mass, determined by GPC using polystyrene standards as reference, of 3,000 g/mol and a weight average molar mass of 5,500 g/mol. The molar mass distribution of the polymer was very narrow and the polydispersity 1.8. The glass transition temperature of the amorphous polymer, determined by DSC, was 19.8° C.

We claim:

1. A process for preparing a melt-processible, hydroxy acid based polymer, comprising:
    forming a low molecular weight polyester-prepolymer from hydroxy acid monomers; and
    copolymerizing said low molecular weight polyester-prepolymer with a monomer which reacts with terminal groups of said low molecular weight polyester-prepolymer in order to form a polymer having a high molecular weight,
    wherein said low molecular weight polyester-prepolymer is provided with carboxy terminal groups, and said carboxy terminated polyester-prepolymer is copolymerized with a diepoxy compound in order to form a copolyester, wherein said low molecular weight polyester-prepolymer has carboxy terminal groups and the polyester-prepolymer has a minimum acid number of 23.

2. The process according to claim 1, wherein the hydroxy acid monomers are copolymerized with an aliphatic diacid or cyclic acid anhydride thereby providing the polyester-prepolymer with carboxylic acid terminal groups.

3. The process according to claim 1, wherein the amount of the aliphatic diacid or cyclic acid anhydride is 0.1–10 mol-% of the amount of the hydroxy acid monomers and the molar ratio of the hydroxy and carboxy groups of the monomers which are copolymerized is less than 1.

4. The process according to claim 1, wherein a polyester prepared from hydroxy acid monomers and optionally diol monomers is reacted with a cyclic acid anhydride thereby providing the polyester-prepolymer with carboxylic acid terminal groups.

5. The process according to claim 4, wherein the amount of the cyclic acid anhydride is 0.1 to 10 mol-% of the amount of the polyester.

6. The process according to claim 1, wherein the molar ratio between the epoxy groups of the diepoxy compound and the carboxylic groups of the polyester is 0.5–1.5.

7. The process according to claim 1, wherein the molar ratio between the epoxy groups of the diepoxy compound and the carboxy groups of the polyester is 0.7 to 1.2, during copolymerization.

8. The process according to claim 2, wherein the molar ratio between the epoxy groups of the diepoxy compound and the carboxy groups of the polyester is over 1, during copolymerization thereby achieving an at least partially cross-linked product.

9. The process according to claim 1, wherein the hydroxy-terminated polyester is copolymerized with diepoxy at a temperature in the range of about 130 to 220° C.

10. The process according to claim 1, wherein the copolymerization is continued until a polyester is achieved which is at least essentially free from free epoxy groups.

11. The process according to claim 10, wherein the copolymerization is continued until the molar mass distribution of the copolyester obtained is at least 2 expressed as the ratio $M_w/M_n$.

12. The process according to claim 11, wherein a copolyester with a multimodal molar mass distribution is prepared.

13. The process according to claim 2, wherein the copolymerization is carried out as bulk polymerization in a melt.

14. The process according to claim 1, wherein said low molecular weight polyester-prepolymer is prepared from lactic acid, and wherein the polymerization of said low molecular weight polyester-prepolymer is carried out as bulk polymerization in the melt phase, the polymerization temperature being gradually raised within the temperature range of 140 to 200° C. at a rate of 5 to 50° C./h and within the temperature range of 200 to 230° C. at a rate of 0 to 30° C./h.

15. The process according to claim 14, wherein a polyesterification catalyst comprising tin or an alkyl or alkoxy compound of tin is used.

16. The process according to claim 1, wherein an alkaline catalyst is used during the reaction between the prepolymer and the diepoxy.

17. The process according to claim 16, wherein a tertiary amine, an ammonium salt, an alkaline metal hydroxide or acetate is used as a catalyst.

18. The process according to claim 17, wherein benzyldimethyl amine, dodecyldimethyl amine, tributyl amine, KOH or NaAc is used as a catalyst.

19. The process according to claim 1, wherein during the preparation of the polyester the water formed as a condensation product is removed by conducting dry inert gas to the polymer melt under stirring.

20. The process according to claim 1 or 19, wherein reduced pressure is used in order to enhance the removal of the water formed as a condensation product during the preparation of the polyester, the reaction pressure being gradually reduced.

21. The process according to claim 1, wherein the copolyester product comprises:

polyester structural units and diepoxy structural units, wherein the polyester structural units are mainly derived from hydroxy acid monomers, the bonds between the structural units are mainly ester bonds, and the number average molar mass, $M_n$, of the polymer is at least 10,000 g/mol, the weight average molar mass, $M_w$, of the polymer is over 20,000 g/mol and the molar mass ratio, expressed as the ratio $M_w/M_n$, of the polymer is over 2.

22. The process according to claim 21, wherein the copolyester has a number average molar mass of 10,000–200,000 g/mol, a weight average molar mass of 20,000–1,000,000, and a molar mass ratio of 2–20.

23. The process of claim 21 or 22, wherein said copolyester has a hydroxy acid or lactone content of less than 3 mol-%.

24. The process of claim 21, wherein the copolyester has a molar mass ratio of 3–12.

25. The process of claim 21, wherein 80–9.9% of the copolyester is formed of hydroxy acid monomer units, 20–0.1% of diacid monomers or cyclic acid anhydride monomers and 10–0% of diol monomers.

26. The process of claim 25, wherein the hydroxy acid monomers comprise hydroxy acids, β-hydroxy acids or lactone.

27. The process of claim 26, wherein the hydroxy acid monomers are selected from the group consisting of L-lactic acid monomers, D-lactic acid monomers, glycol acid, L-mandelic acid, D-mandelic acid, -hydroxyisobutane acid, lactide and a mixture thereof, the concentration of free hydroxy acid monomers and lactones being at most 10 wt-% of the total weight of the polymer.

28. The process of claim 26 or 27, wherein a part of the hydroxy acid monomers are multifunctional.

29. The process of claim 26 or 27, wherein a part of the hydroxy acid monomers are monofunctional.

30. The process of claim 21, wherein the copolyester further comprises diacid monomers which comprise succinic acid, adipic acid and maleic acid.

31. The process of claim 21, wherein the copolyester further comprises cyclic acid anhydride monomers which comprise succinic anhydride, glutaric anhydride, or phthalic anhydride.

32. The process of claim 21, wherein the diepoxy structural units comprise aliphatic or cycloaliphatic diepoxy compounds.

33. The process of claim 32, wherein the diepoxy structural units comprise a glycidyl ether.

34. The process of claim 21, wherein the copolyester is long chain branched or partially branched.

35. The process of claim 21, wherein the main chain of the polyester structural units is mainly aliphatic.

36. The process of claim 35, wherein the polyester structural units further comprise diacid monomers and wherein the hydroxy acid monomers and the diacid monomers are aliphatic.

37. The process of claim 21, wherein the copolyester is hydrolytically or enzymatically degradable.

38. The process of claim 21, wherein the viscosity of the polymer melt is between 10 and 5,000 Pa s, measured by capillary rheometry at a temperature of 200° C. at a shear rate of 200 1/s.

39. A polyester for the preparation of a melt-processible copolyester, wherein said polyester comprises:

structural units derived from a hydroxy acid and either an organic diacid or a cyclic acid anhydride, the terminal groups of the polyester comprise carboxylic groups, and wherein the polyester has a number average molar mass of between about 1,000 and 8,000 g/mol, has a lactone content of less than 10 wt-% and has a content of free hydroxy acid of less than 10 wt-%.

40. The polyester of claim 39, wherein the structural units of the polyester are derived from lactic acid.

41. The polyester of claim 39 or 40, wherein the polyester further contains structural units derived from a diol.

42. A polymer blend, comprising:

a polymer according to claim 21 mixed with a thermoplastic polymer.

43. A polymer blend, comprising:

a polymer according to claim 21 mixed with biodegradable polymers.

44. The polymer blend of claim 42 or 43, wherein the polymer blend further comprises fillers, reinforcing agents or mixtures thereof.

45. The process according to claim 7, wherein the molar ratio between the epoxy groups of the diepoxy compound and the carboxy groups of the polyester is about 1 during copolymerization.

46. The process according to claim 8, wherein the molar ratio between the epoxy groups of the diepoxy compound and the carboxy groups of the polyester is about 1.2 to 2 during copolymerization thereby achieving an at least partially cross-linked product.

47. The process according to claim 9, wherein the hydroxy-terminated polyester is copolymerized with diepoxy at a temperature in the range of about 150 to 190° C.

48. The process according to claim 15, wherein said polyesterification catalyst comprises Sn(II)octoate.

49. The process according to claim 22, wherein the copolyester has a number average molar mass of 15,000–100,000 g/mol, and a weight average molar mass of 30,000–600,000.

50. The process according to claim 33, wherein the diepoxy structural units are formed from 1,4-butanedioldiglycidyl ether or 3,4-epoxycyclohexylmethyl-3,4-epoxycyclohexane carboxylate.

51. The process according to claim 38, wherein the viscosity of the polymer melt is between 50–2,000 Pa s, measured by capillary rheometry at a temperature of 200° C. at a shear rate of 200 1/s.

52. The polyester of claim 41, wherein said diol is an aliphatic diol.

53. The copolyester of claim 28, wherein the multifunctional hydroxy acid monomers comprise maleic acid monomers.

54. A process for preparing a melt-processible, hydroxy acid based polymer, comprising:

forming a low molecular weight polyester-prepolymer from hydroxy acid monomers; and copolymerizing said low molecular weight polyester-prepolymer with a monomer which reacts with terminal groups of said low molecular weight polyester-prepolymer in order to form a polymer having a high molecular weight, wherein said low molecular weight polyester-prepolymer is provided with carboxy terminal groups, and said carboxy terminated polyester-prepolymer is copolymerized with a diepoxy compound in order to form a copolyester, wherein said low molecular weight polyester-prepolymer has carboxy terminal groups, and wherein the forming step and the copolymerizing step are carried out as a bulk polymerization in a melt, and the number average molecular weight of the polyester-prepolymer is 1000 to 8000 g/mol.

* * * * *